(12) United States Patent
Arlton et al.

(10) Patent No.: US 8,083,173 B2
(45) Date of Patent: Dec. 27, 2011

(54) ROTARYCRAFT POWER AND PROPULSION SYSTEM

(76) Inventors: Paul E. Arlton, West Lafayette, IN (US); David J. Arlton, West Lafayette, IN (US)

( * ) Notice: Subject to any disclaimer, the term of this patent is extended or adjusted under 35 U.S.C. 154(b) by 903 days.

(21) Appl. No.: 12/016,821

(22) Filed: Jan. 18, 2008

(65) Prior Publication Data

US 2008/0245924 A1    Oct. 9, 2008

Related U.S. Application Data

(60) Provisional application No. 60/885,559, filed on Jan. 18, 2007.

(51) Int. Cl.
*B64C 27/08* (2006.01)
(52) U.S. Cl. ................................. 244/17.23
(58) Field of Classification Search .............. 244/17.23, 244/17.25, 17.11, 17.19, 67, 69, 23 C; 416/124, 416/125, 127; 89/1.808; 446/36, 37
See application file for complete search history.

(56) References Cited

U.S. PATENT DOCUMENTS

| | | | |
|---|---|---|---|
| 3,149,803 A | | 9/1964 | Petrides et al. |
| 3,570,787 A | * | 3/1971 | Stahmer ..................... 244/17.23 |
| 3,612,444 A | | 10/1971 | Girard |
| 3,643,599 A | | 2/1972 | Hubich |
| 4,080,922 A | | 3/1978 | Brubaker |
| 4,478,379 A | | 10/1984 | Kerr |
| 5,004,976 A | | 4/1991 | Markow et al. |
| 5,015,187 A | | 5/1991 | Lord |
| 5,497,960 A | | 3/1996 | Previnaire |
| 6,179,247 B1 | | 1/2001 | Milde, Jr. |
| 6,347,764 B1 | | 2/2002 | Brandon et al. |
| 6,402,031 B1 | | 6/2002 | Hall |
| 2006/0011777 A1 | | 1/2006 | Arlton et al. |
| 2010/0025526 A1 | * | 2/2010 | Lawrence ................... 244/17.23 |
| 2011/0006166 A1 | * | 1/2011 | Arlton et al. ................... 244/7 A |

OTHER PUBLICATIONS

Predator Unmanned Aerial Vehicle (UAV), USA, www.airforce-technology.com/projects/predator, printed Dec. 16, 2002.
Internet article "Brushless DC Electric Motor," http://web.archive.org/web/20050721092509:http://en.wikipedia.org/wiki/Brushless_DC_electric_motor>, Wikipedia.org, Jul. 21, 2005.
International Search Report and Written Opinion for PCT/US08/51476, dated Jul. 18, 2008.

* cited by examiner

*Primary Examiner* — Tien Dinh
(74) *Attorney, Agent, or Firm* — Barnes & Thornburg LLP

(57) ABSTRACT

A rotary wing vehicle includes a body structure having an elongated tubular backbone or core and a counter-rotating coaxial rotor system having rotors. The rotor system is used to move the rotary wing vehicle in directional flight.

17 Claims, 13 Drawing Sheets

ROTARYCRAFT POWER AND PROPULSION SYSTEM

This application claims priority under 35 U.S.C. §119(e) to U.S. Provisional Application Ser. No. 60/885,559, filed Jan. 18, 2007, which is expressly incorporated by reference herein.

BACKGROUND

The present disclosure relates to aerial vehicles and particularly to unmanned aerial vehicles (UAV). More particularly, the present disclosure relates to unmanned rotary wing vehicles.

Rotary wing vehicles are used in a variety of applications. Unmanned rotary wing vehicles are used by the military, law enforcement agencies, and commercial activities for aerial reconnaissance operations.

SUMMARY

According to the present disclosure, a rotary wing vehicle includes a body or airframe structure having a non-rotating structural backbone, or core, or spine. Also included is a counter-rotating coaxial rotor system having a rotor module including a rotor hub and a plurality of rotor blades connected to the hub. In an illustrative embodiment, each rotor module is supported by the non-rotating structure spine and is connected to a separate rotor driver, which may be a drive motor, connected to the rotor hub to drive the rotor blades about a longitudinal axis of rotation. In an illustrative embodiment, the non-rotating structural spine passes through the rotor driver and the rotor driver is positioned between spaced-apart opposite ends of the non-rotating structural spine. In an illustrative embodiment, a plurality of distributed power sources, which may include, for example, batteries, fuel cells or hybrid gas-electric generators, are provided to supply electric power to the plurality of rotor drivers. The distributed power sources and other modules, such as control modules, payload modules and electronics modules may be used balance the vehicle at a desired point to improve in-flight control authority. Power transmission to and between the rotor blades is accomplished by electrical wiring instead of mechanical shafting. A modular structure is provided which is desirable in manufacturing the vehicle.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
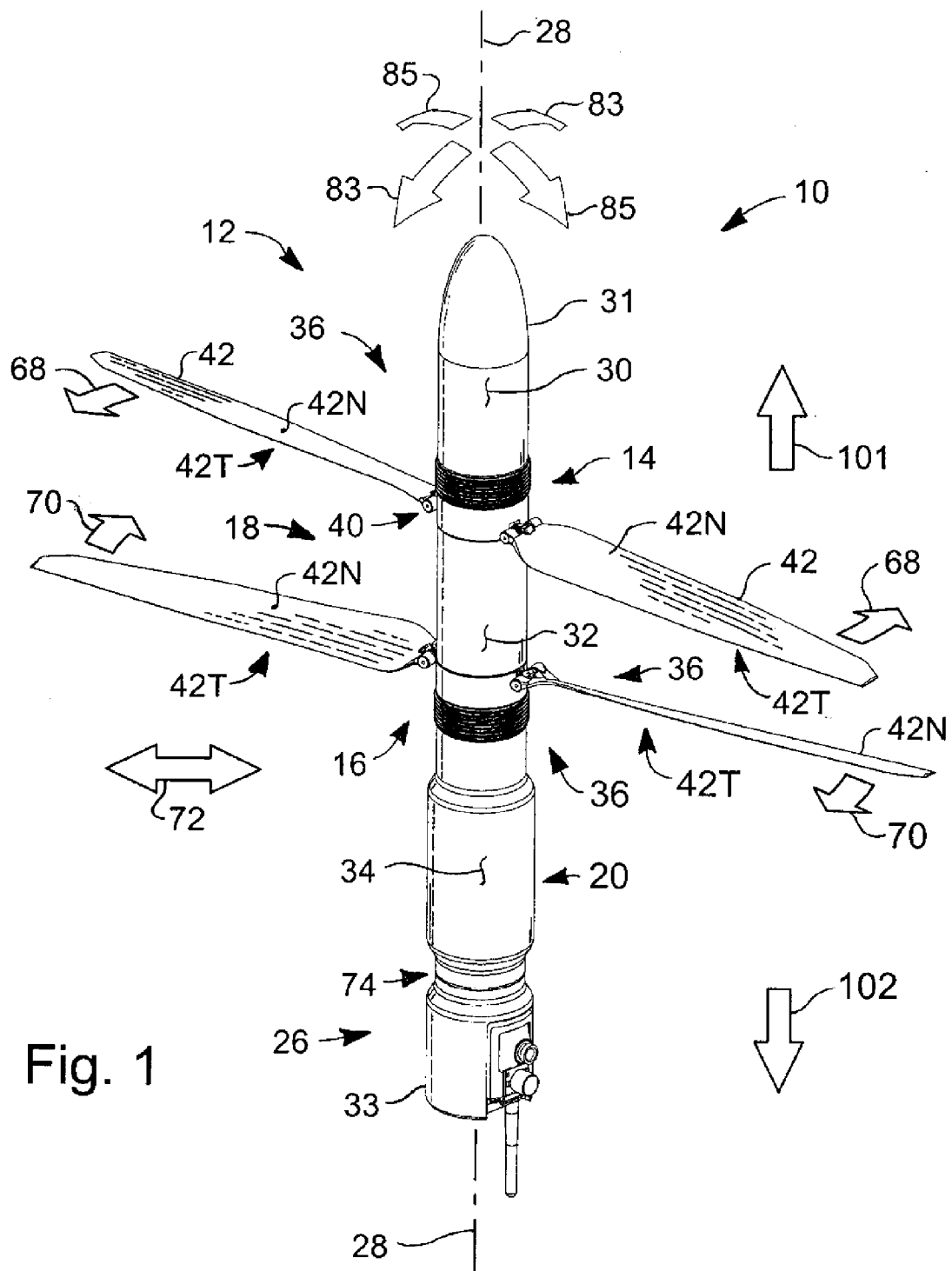
FIG. 1 is a perspective view of a rotary wing vehicle in accordance with the present disclosure showing the vehicle including a co-axial, counter-rotating rotor system and an elongated body having interchangeable modular components coupled to the rotor system.
Figure 2:
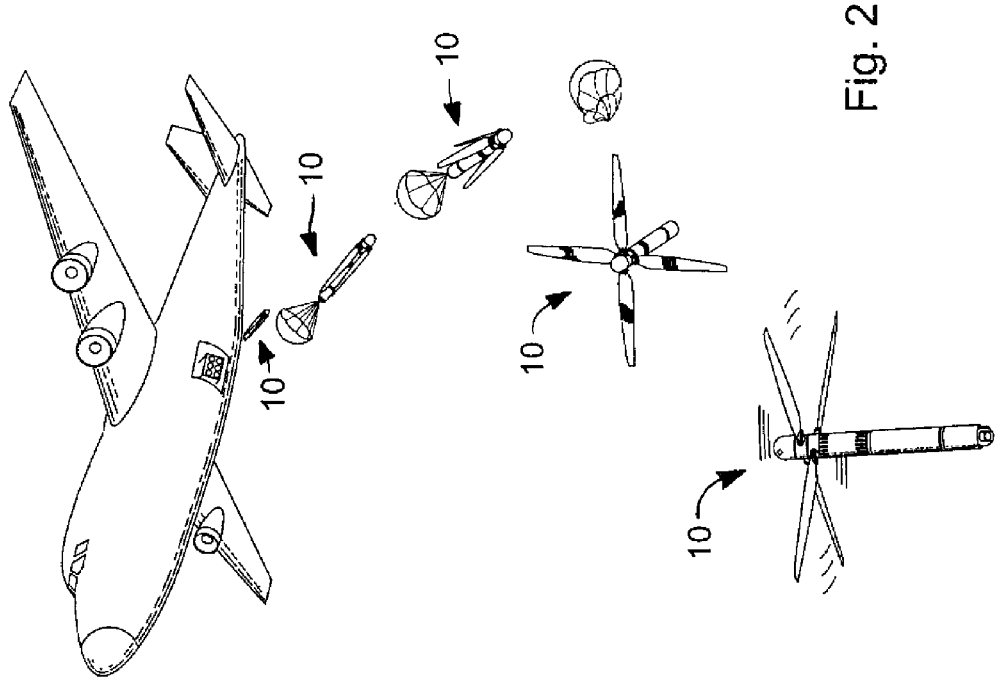
FIG. 2 is a is a perspective view showing a deploying of the rotary wing vehicle of FIG. 1 from an aircraft in flight.
Figure 3:
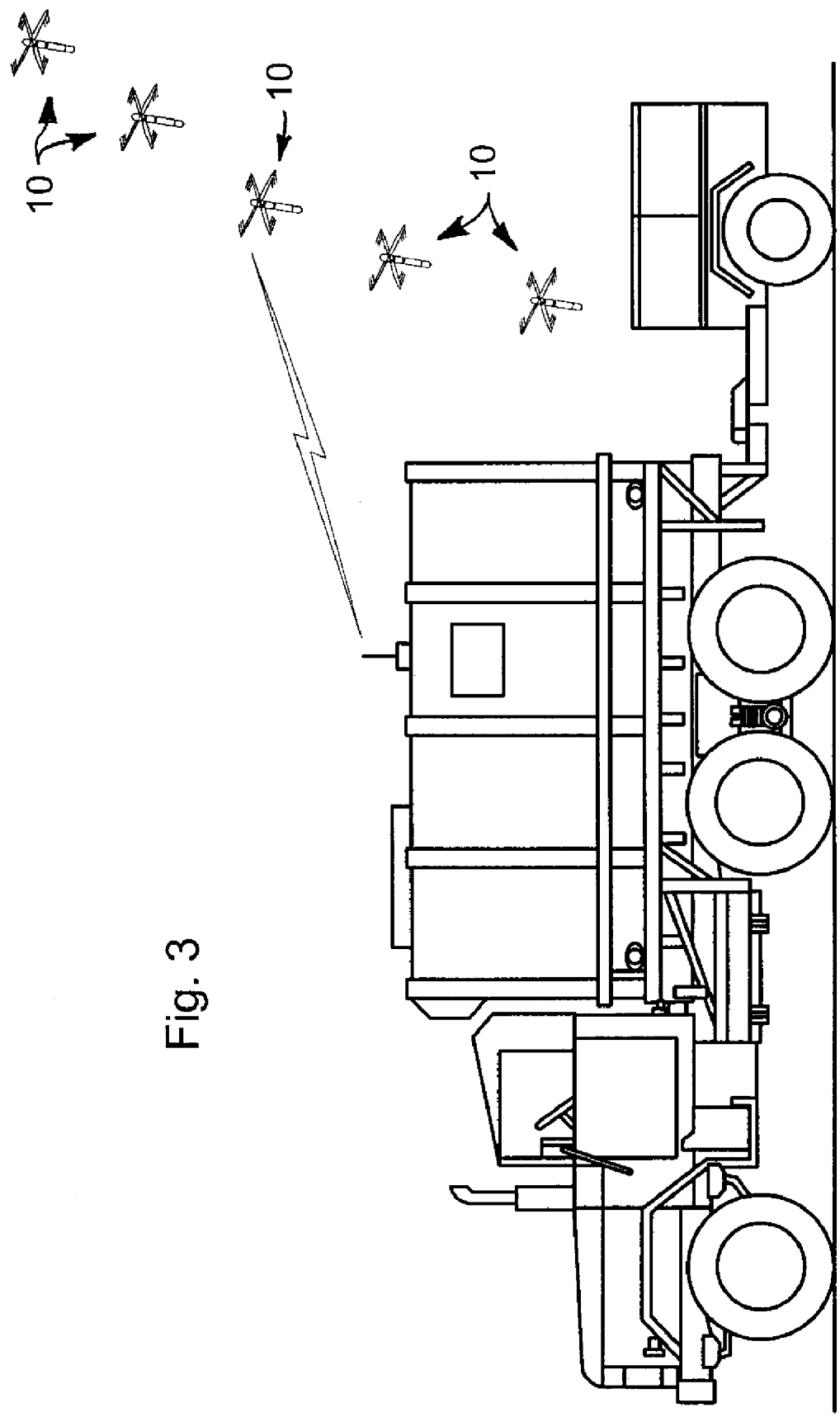
FIG. 3 is a perspective view of an integrated micro-rotor-craft system in accordance with the present disclosure to provide remote surveillance of an area and showing a mobile command center of the system and various rotary wing vehicles of the system which are in communication with a mobile command center.
Figure 4:
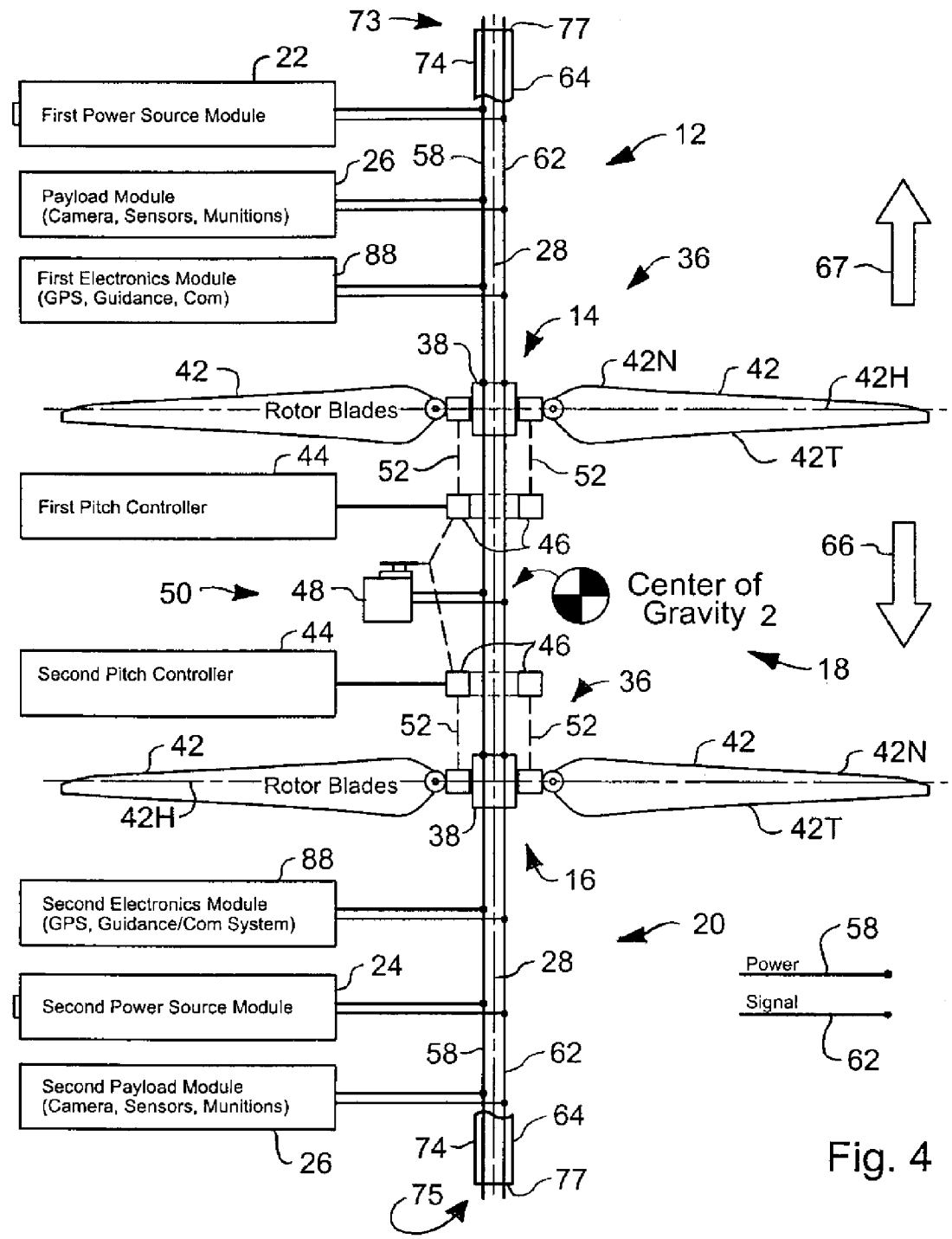
FIG. 4 is a diagrammatic view of a rotary wing vehicle in accordance with the present disclosure showing the rotary-wing vehicle having a central buss architecture with power and signal conduits, a guidance system and a pair of rotor systems coupled to an airframe comprising a non-rotating structural spine or backbone and carrying a payload.

A rotary wing vehicle 10 is shown, for example, in FIG. 1 in a flying or flight orientation for movement of vehicle 10 in directions 72, 101 and 102. Rotary wing vehicle 10 includes an airframe 74, forming a non-rotating structural spine 64, and further includes an upper section 12, first and second rotor modules 14, 16, a middle section 18, and a lower section 20. Also included are first and second power source modules 22, 24 to provide power to the rotor modules, a nose cone 31 at a first end 73 of the airframe 74 and a tail cone 33 arranged at a second spaced-apart end 75 of airframe 74, and a payload module 26 to deliver goods or services and/or to gather desired data during a flight of the vehicle 10. First end 73 is considered to be oriented upward and second end 75 is considered to be oriented downward when vehicle 10 is in the flight configuration as shown in FIG. 1. All modules 14, 16, 22, 24, 26 are coupled to and arranged in spaced-apart relation along longitudinal body, or non-rotating structural spine 64, having airframe axis, 28, as shown in FIGS. 1 and 4. Internal mechanical and electrical components or modules within upper section 12 and middle section 18 of vehicle 10 are enclosed by a thin-walled upper body shell 30 and a middle body shell 32, respectively. A lower body shell 34 covers a portion of lower section 20.

Figure 5:
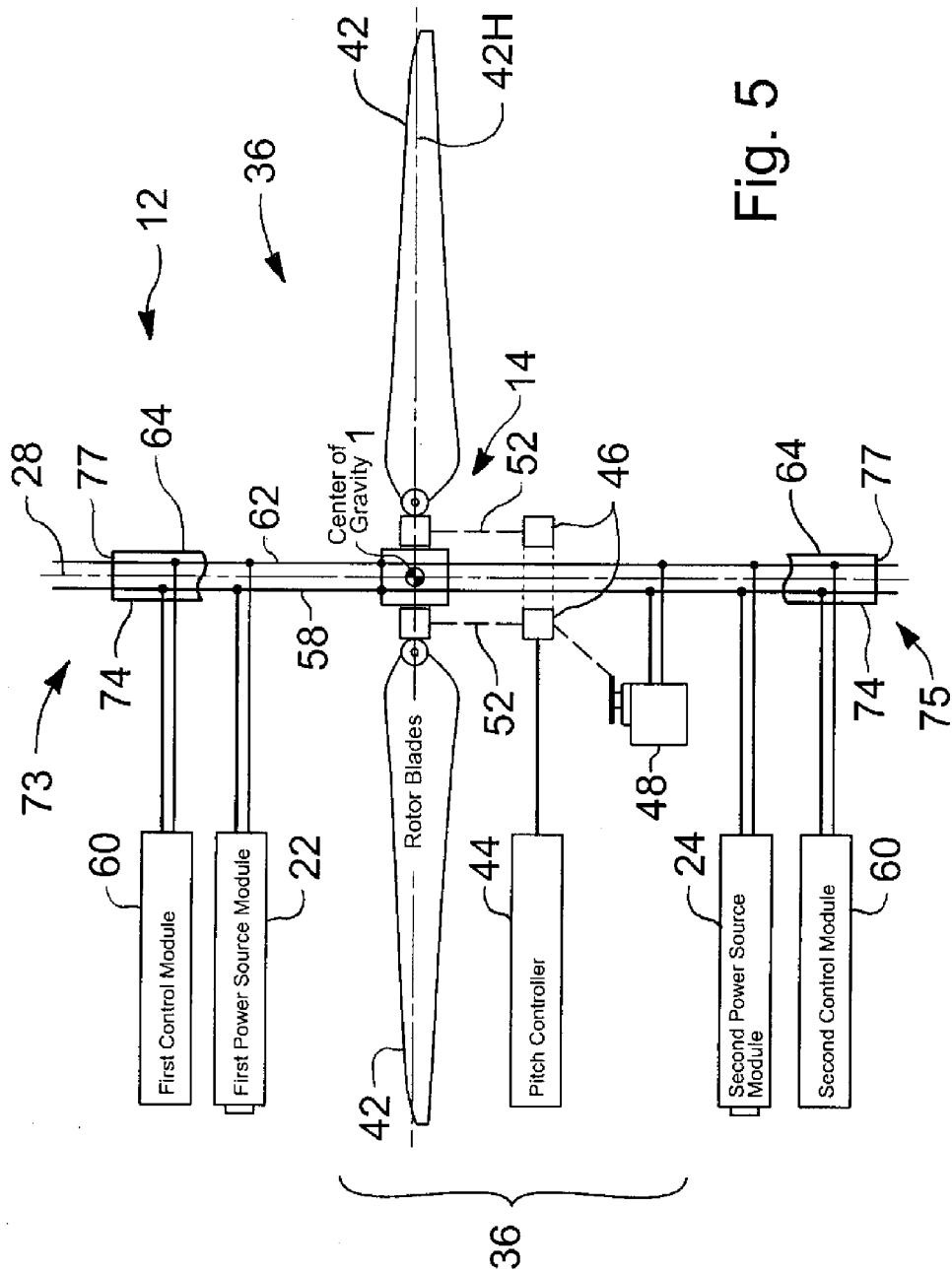
FIG. 5 is a diagrammatic view of a rotary wing vehicle in accordance with the present disclosure showing a rotor system, control module and power source module communicating through a central data/power buss with power and signal conduits.

Rotary wing vehicle 10 includes a rotor system 36 which includes a rotor module 14 having a rotor driver 38 located within a hub section 40 and operably coupled to a plurality of rotor blades 42, each rotor blade 42 having a longitudinal axis 42H. Longitudinal axes 42H intersect longitudinal axis 28 of airframe 74 to define an approximate center of gravity CG1 for rotor system 36, as shown in FIG. 5. Rotor system 36 also includes a pitch controller 44 such as a swashplate 46 (see FIGS. 5 and 6) that is operably coupled to rotor blades 42 to vary the cyclic and/or collective pitch of rotor blades 42 in response to output from a servo module 50. Servo module 50 includes swashplate 46 and/or swashplates 80 or 82, and servo actuator 48 coupled to one or more of the swashplates 46, 80, 82 (see FIGS. 6 and 7) through linkages 52 (see FIG. 6). In accordance with the present disclosure, an approximate center of gravity CG2 of rotary-wing vehicle 10 may be located between pitch controllers 44, as shown in FIG. 4. While generally lying on longitudinal axis 28, the symbol for center of gravity CG2 of vehicle 10 is shown to one side of axis 28 for convenience purposes.

Figure 6:
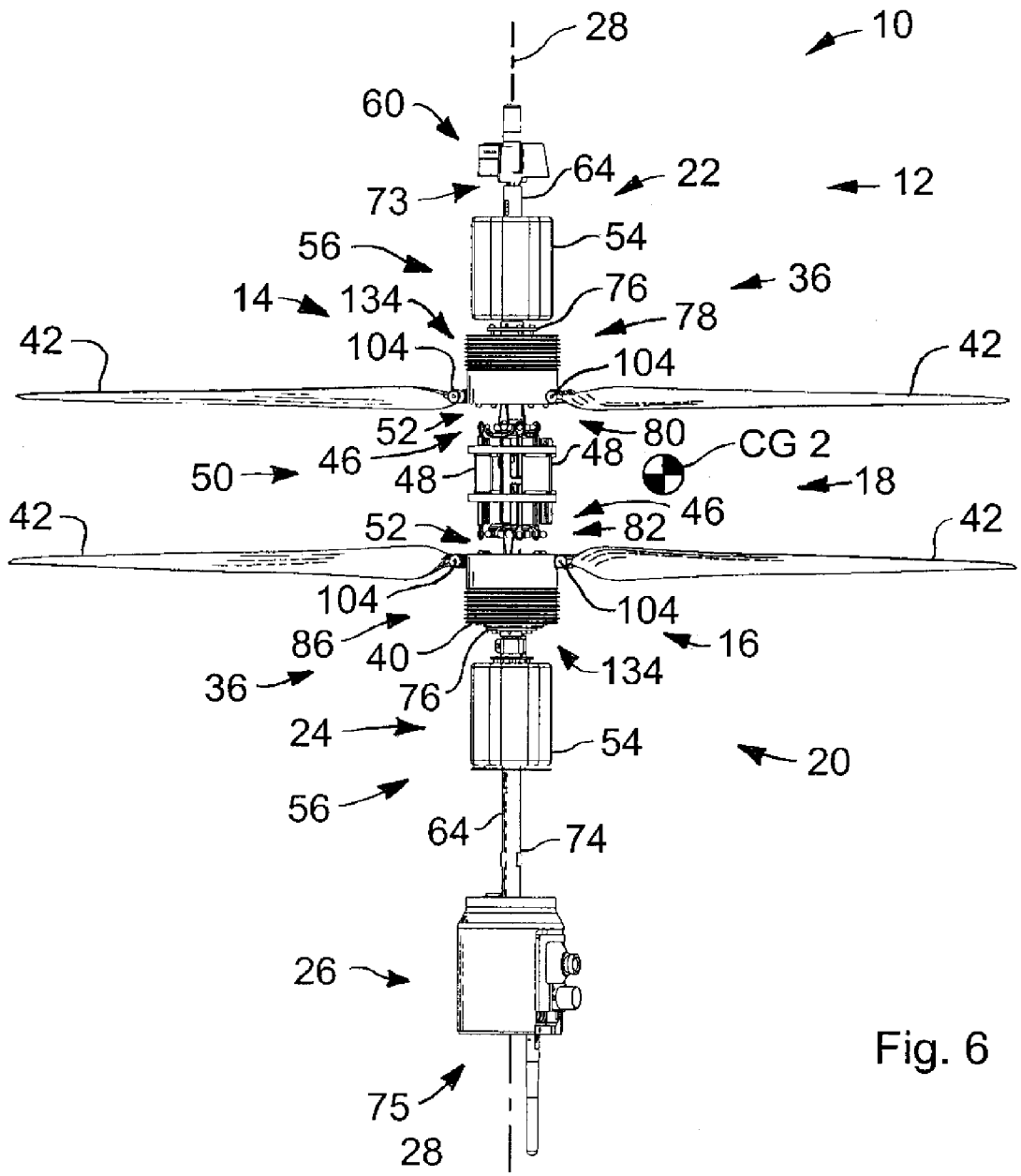
FIG. 6 is a side elevation view of the rotary wing vehicle of FIG. 1 with aerodynamic body shells removed to reveal system modules and showing, for example, (from top to bottom) a control module, a first power source module, a first rotor module, a pitch controller, a second rotor module, a second power source module, and a payload module.

Power, such as electricity, emanates from, for example, a power module 56. Two power modules 56 are shown in FIG. 6 and each includes a respective power source module 22 or 24 and batteries 54 or fuel from a storage tank (not shown). Power from module 56 flows through power conduit 58 across rotor system 36 and provides power to operate a control module 60, rotor driver 38 and servo module 50. Control signals from control module 60 flow along a signal conduit 62 and regulate the speed of rotor driver 38 and the positioning output of servo module 50. Power conduit 58 and signal conduit 62 are included on an electric printed circuit board 63 (see FIG. 7) and run between a first or inflow side 42N and a second or outflow side 42T of rotor blades 42 through channels formed in a structural backbone or spine 64 (see FIG. 7) of rotary wing vehicle 10. Non-rotating structural spine 64 includes a hollow portion 77 to accommodate, for example, conduits 58 and 62.

In hovering flight, first rotor module 14 and second rotor module 16 rotate in opposite directions about airframe axis 28 forcing air downward in direction 66 and lifting rotary wing vehicle 10 in an upwardly direction 67, as suggested in 4. First rotor module 14 has rotor blades 42 configured to rotate in a direction 68, and second rotor module 16 has rotor blades 42 configured to rotate in a direction 70 about body axis 28, as suggested in FIG. 1. Because first rotor module 14 and second rotor module 16 are equipped with a cyclic pitch control, rotary wing vehicle 19 is configured for directional flight in directions 72, 101, and 102 and body axis 28 is in a substantially vertical orientation, as suggested in FIG. 1.

Figure 7:
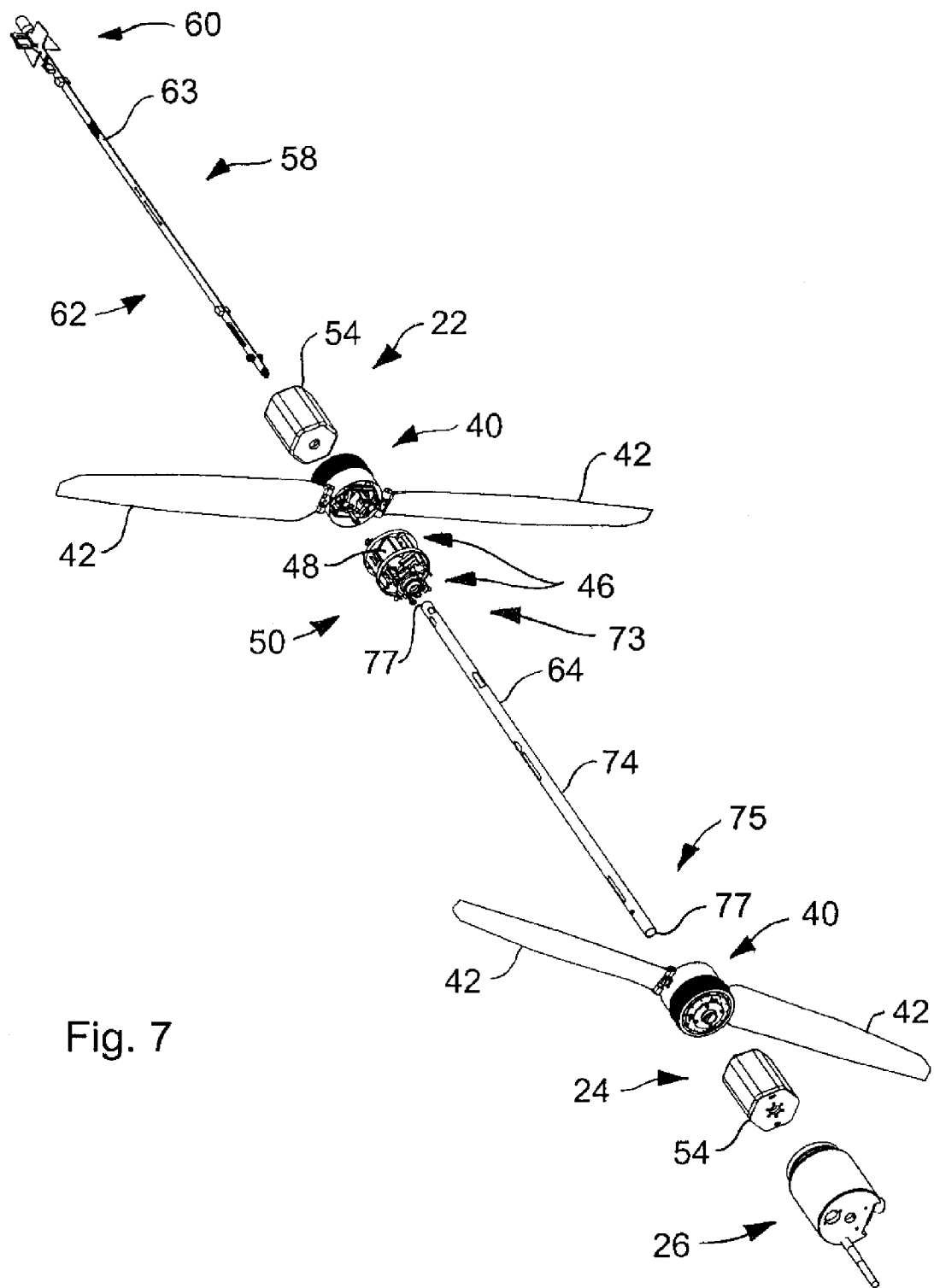
FIG. 7 is an exploded perspective view of illustrative components included in the rotary wing vehicle of FIG. 6.

Airframe 74 forms structural backbone or spine 64 of rotary wing vehicle 10 and generally runs vertically through the center of rotary wing vehicle 10 from upper section 12 to lower section 20, as shown in FIG. 7. In illustrative embodiments, airframe 74 is a non-rotating tube. First and second rotor modules 14, 16, and all components or modules within upper section 12, middle section 18, and lower section 20 are coupled to spine 64, or airframe 74. Referring now to FIG. 7, airframe 74 may act as or include, for example, power conduit 58, signal conduit 62 and possibly other conduits for electrical wiring (not shown), plumbing (not shown), and mechanical linkages (not shown) to serve modules located in upper section 12, middle section 18 and lower section 20 of rotary wing vehicle 10. Airframe 74 may be manufactured of carbon graphite fiber, fiberglass, aluminum alloy number 7075, or a similar alloy, or other similar materials with an outside diameter of about 0.5 inches.

Rotary wing vehicle 10 is configured to include three body sections, as suggested in FIG. 6. Upper section 12 is includes an electronics module 88 (see FIG. 4) to provide, for example, at least guidance and communication services for vehicle 10 in flight and first power source module 22 to provide, for example, power to drive rotor blades 42. First power source module 22 is coupled, for example, to upper or first end 73 of airframe 74. Upper section 12 may also include a first motor speed controller 76, and a first brushless motor 78 (see FIG. 6). Middle section 18 may include a first swashplate 80, a second swashplate 82 and servo actuators 48. Lower section 20 may include a second motor speed controller 84, a second brushless motor 86, electronics module 88 (see FIG. 4), second power source module 24, and payload module 26 coupled to lower, or second end 75 of airframe 74. Fixed or moveable aerodynamic surfaces (not shown) may be attached to another servo actuator for additional flight control (not shown).

In general, power modules 56, which may, for example, include batteries 54, are relatively heavy. If all power modules 56 are located below rotor modules 14, 16 then rotary wing vehicle 10 is naturally stable because power modules 56 tend to be pulled downwardly by a gravitational force. Control authority, however, is generally reduced as stability increases. A feature of the current disclosure is to position weighty components such as power modules 56 evenly about the center of the rotor system so that any center of gravity, for example, CG1 and CG2, of the vehicle 10 coincides with an approximate center of lift of the rotor system 36 which can be located mid-way between the coaxial rotor modules 14, 16.

Rotor modules 14, 16 are similar to one another in structure and function so that the description of one rotor module 14 applies to the other rotor module 16 as well. Rotor module 14 includes a rotor mount 90, rotor hub 40, first and second ball bearings 92, 94, a ring clip 96, a blade yoke 98 and rotor blades 42. When assembled, bearings 92, 94 are retained on shaft 103 of rotor mount 90 by ring clip 96 engaging a slot 100 on a boss 102 extending from rotor mount 90. Rotor blade 42 is held in place by a pin 104 extending through a cap 106 and an aperture 108 formed in an axle 110. Axle 110 passes through a bearing aperture 112 formed in hub 40 and into an aperture 114 in yoke 98 when it is retained by another pin (not shown).

Figure 8:
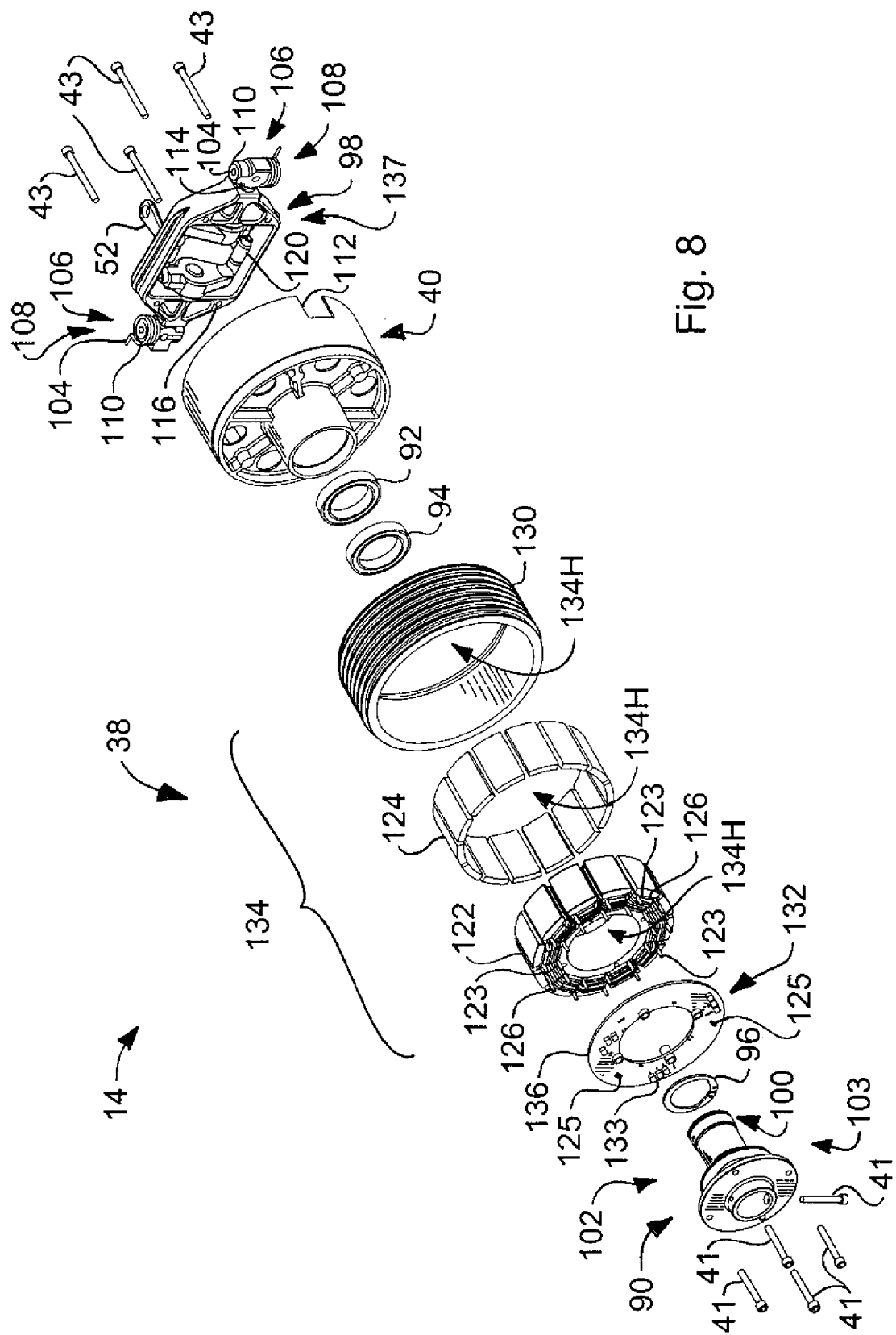
FIG. 8 is an exploded perspective view of the rotor module (without rotor blades) included in the rotary wing vehicle of FIG. 6 showing, for example, (from right to left) a swashplate assembly, a hub, a spacer, a rotor ring, a plurality of rare-earth magnets, a laminate stack, an electronic motor speed controller (ESC), and a mount.

As shown in FIG. 8, rotor module 14 is adapted to support both cyclically and collectively pitchable rotor blades 42. Links 52 couple pitch arms 120 to swashplate 46.

Figure 9:
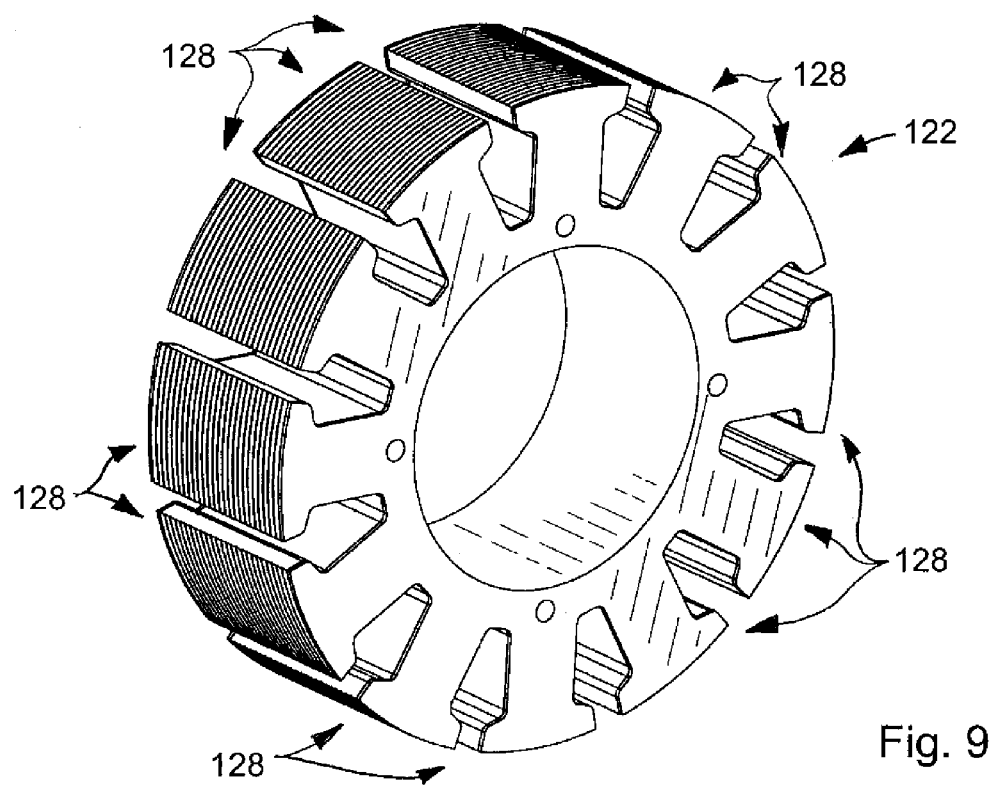
FIG. 9 is an enlarged perspective view of the laminate stack of FIG. 8.
Figure 10:
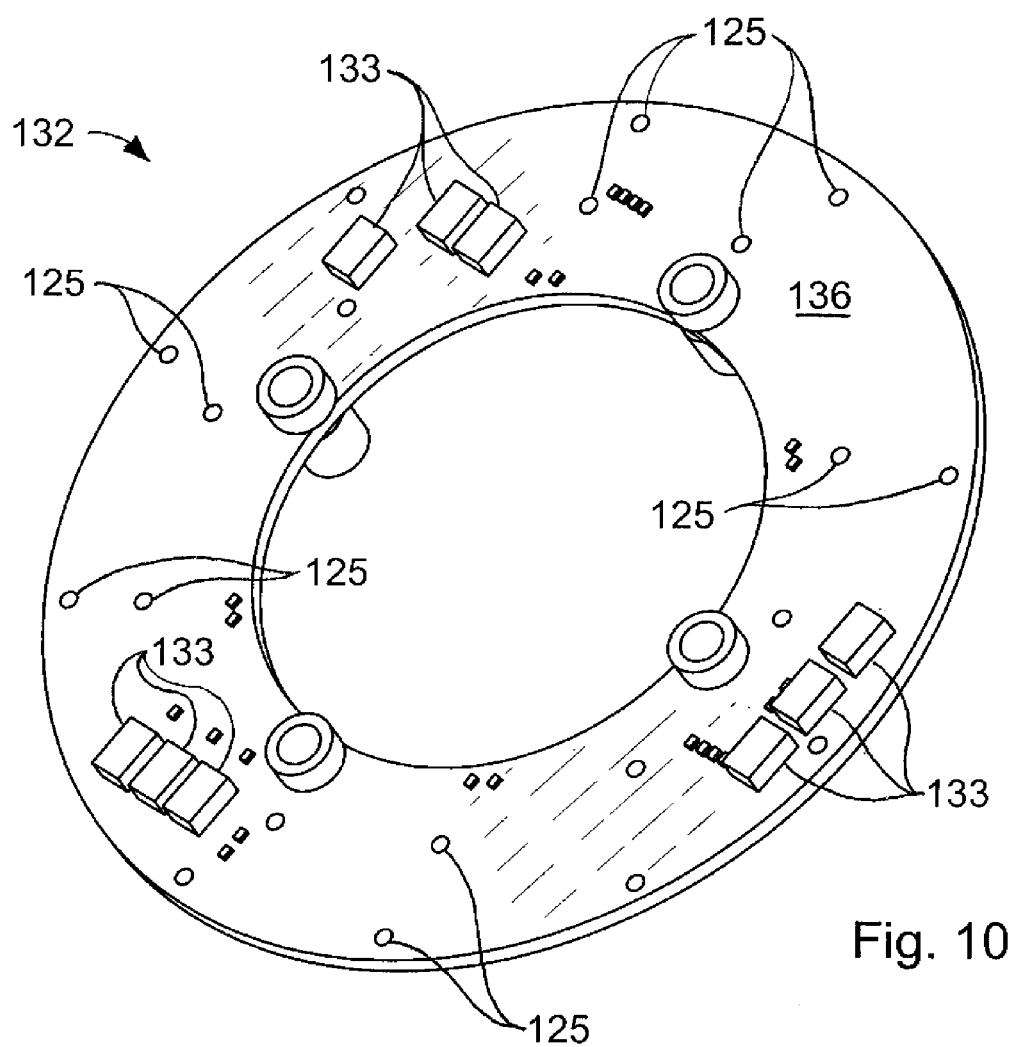
FIG. 10 is an enlarged perspective view of the electronic motor speed controller (ESC) of FIG. 8.
Figure 11:
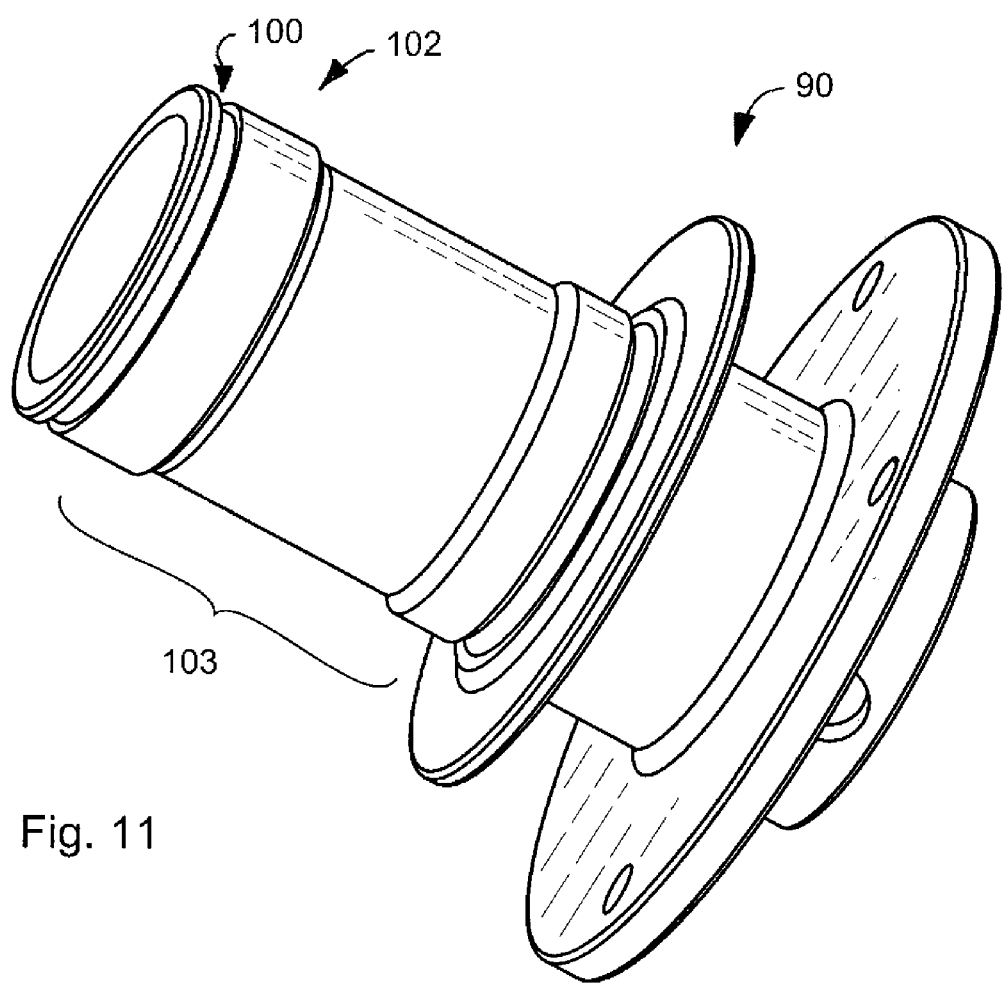
FIG. 11 is an enlarged perspective view of the mount of FIG. 8.

In an illustrative embodiment, rotor driver 38 is shown in FIG. 8 as a direct drive motor 134. Direct drive motor 134 includes a laminate stack 122 with electromagnetic windings 126 and rare-earth magnets 124. Direct drive motor 134 is positioned to lie within or adjacent to rotor hub 40. Direct drive motor 134 is formed to include a hollow-core 134H, as suggested in FIG. 8. Hollow core 134H is configured to receive non-rotating structural spine 64, as suggested in FIGS. 6 and 7. Direct drive motor 134 is configured to drive rotor blades 42 about longitudinal body axis 28. Laminate stack 122 is about 0.6 inches thick having about 23 laminations of magnetically conductive iron material as suggested in FIG. 9. Twelve windings 126 are made of 23 gauge copper wire wrapped around teeth 128 of laminate stack 122 to produce a 12 pole motor. Rotor ring 130, also known as back iron, is made of magnetically permeable iron to support the magnetic flux between magnets 124 during operation.

Direct drive motor 134 has a generally hollow core 134H configured, as noted earlier, to accommodate structural spine or backbone 64. In an illustrative embodiment, direct drive motor 134 is an outrunner-style motor because rare-earth magnets 124 are located outside of and rotate around laminate stack 122 and windings 126. This contrasts with in-runner style motors (not shown) where the magnets are attached to a solid shaft and rotate inside of a laminate stack and windings While shown in FIG. 8 as a collection of discrete segments, rare earth magnets 124 can be formed into a single continuous ring of magnetic material that is magnetized into multiple discrete north-south poles around its circumference during manufacture thereby forming a multi-pole magnetic ring or ring magnet. A feature of a multi-pole ring magnetic is that there are no air gaps between magnetic segments and magnetic flux may flow more efficiently between magnetic segments during operation of direct drive motor 134.

An electronic motor speed controller 132 (ESC) is provided to control direct drive motor 134 and is positioned adjacent to laminate stack 122 so that terminal ends 123 of windings 126 directly abut or pass through a circuit board 136 of electronic motor speed controller 132. A feature of the present disclosure is that by terminating windings 126 in vias 125 of motor speed controller 132, windings 126 may be electronically connected to energized by a computer system on electronic speed controller in different combinations know as Delta winds and Wye winds to adjust the power and efficiency of direct-drive motor 134 for various operating conditions.

The way motor windings are connected together in groups of three determines whether they are configured as Wye or Delta winding. If three windings are connected together at only one end, the connections appear to be in the shape of a Y and are called Wye windings. If three windings are connected together at both ends in the quasi-triangular shape of the Greek letter D, they are called Delta windings.

Wye windings, in accordance with the present disclosure, may be used for low speed operation of rotor modules 14, 16, such as for efficient hovering flight of rotary wing vehicle 10. Delta windings, in an illustrative embodiment according to the present disclosure, are used for high speed operation of rotor modules 14, 16 such as for high-speed horizontal flight of rotary wing vehicle 10.

In an illustrative embodiment in accordance with the present disclosure, motor speed controller 132 includes power relays, or contactors, 133 that can reconfigure connections of windings 126 "on the fly" for efficient operation of direct drive motor 134 at both high and low speeds.

In illustrative embodiments, rotor mount 90 may be machined from aluminum or injection molded in one piece from a polycarbonate plastic or fiberglass-filled nylon. Rotor hub 40 may be injection molded in one piece from a thermoplastic material such as nylon or acetal. Rotor mount 90 is coupled to hub 40 with fasteners 41. Blade yolk 98 is coupled to hub 40 with fasteners 43. Rotor blades 42 are supported in flight by rotor hub 40, which forms part of the exterior body shell of vehicle 10, instead of by traditional coaxial shafts coincident with body axis 28. This places rotor support bearings 92, 94 very close to rotor blades 42 and frees space within the central body portion of rotary wing vehicle 10 to house direct-drive motor 134.

In the illustrative fixed-pitch rotor system, radial flight forces produced by rotating blades 42 are supported by internal yoke 98 coupled to rotor blades 42. Yoke 98 is formed to include an aperture 137 arranged to accommodate airframe 74, thus obviating the need for special thrust bearings.

Referring once again to FIG. 6, the illustrative embodiment comprises rotor modules 14, 16, swashplates 80, 82, and servo module 50 coupled to non-rotating airframe 74 in mirror symmetry around center of gravity CG2 of vehicle 10. While a coaxial rotor system with two rotors is disclosed, rotary wing vehicle 10 could be arranged having additional rotor systems (not shown) spaced apart along the length of non-rotating airframe 74 for additional thrust or operational capabilities.

Rotor modules are coupled to swashplates 80, 82 by pitch links 52. In operation, rotor hubs 40 rotate in opposite directions. Servo module 50 is controlled by onboard flight control electronics to tilt simultaneously swashplate 80 and swashplate 82 which then cyclically vary the blade pitch angle of rotating rotor blades 42 to tilt rotary wing vehicle 10 in one of an aircraft pitch directions 83 and aircraft roll directions 85, as suggested in FIG. 1. In other embodiments having collective pitch, a third servo and third pitch link (not shown) are provided to vary the axial location of swashplates 80, 82 along longitudinal body axis 28 and to vary the collective pitch of rotor blades 42 using electronic Collective-Cyclic Pitch Mixing (CCPM). Using servos located between rotor modules and directly coupling control swashplates with linkages to control a coaxial rotor system in this way may be a desirable feature.

Figure 12:
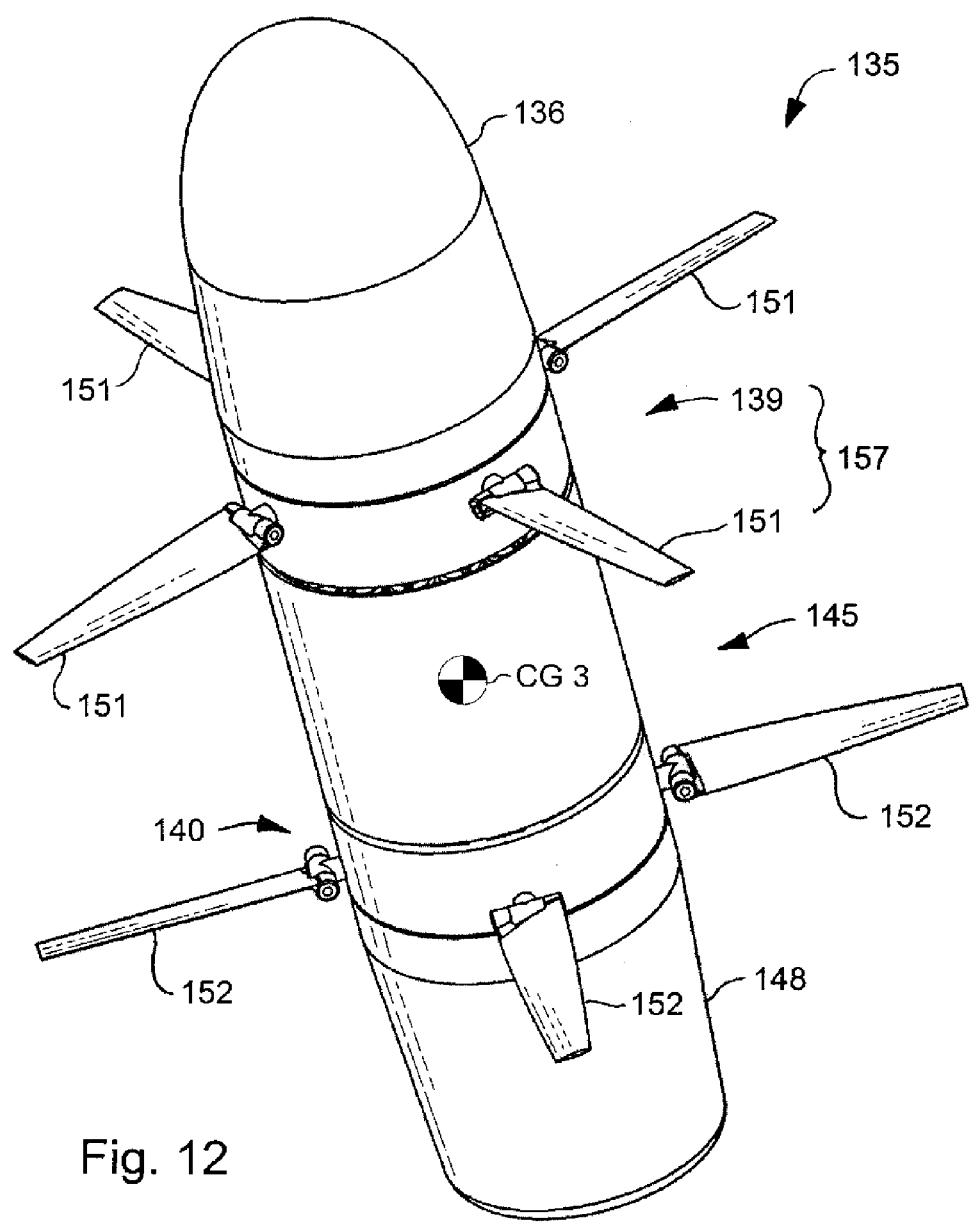
FIG. 12 is a perspective view of an alternative embodiment of a rotary wing vehicle in accordance with the present disclosure showing the vehicle including a co-axial, counter-rotating rotor system and an elongated body having interchangeable modular components coupled to a rotor module.
Figure 13:
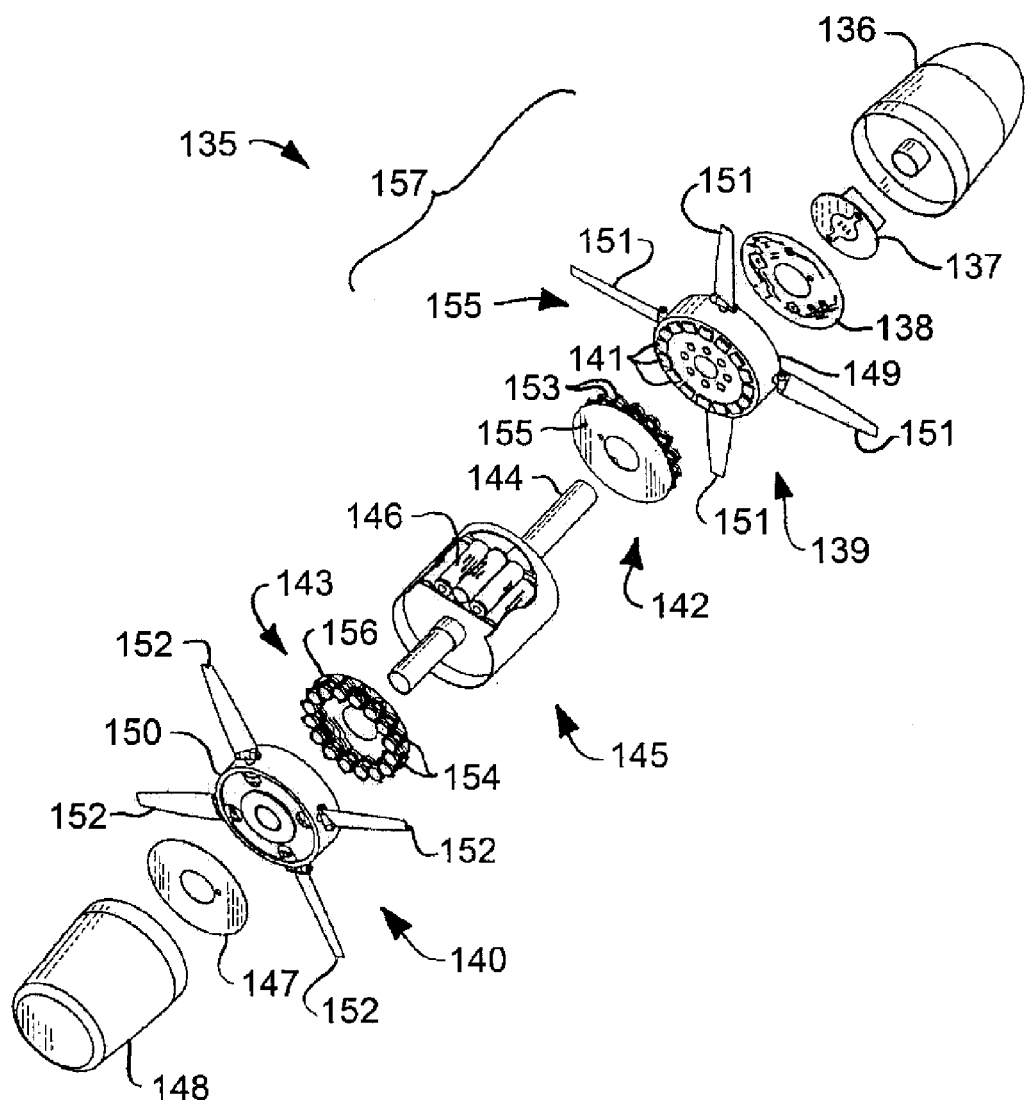
FIG. 13 is an exploded perspective view of the embodiment of FIG. 12 showing (night to left) a nose cone, a GPS antenna, a first computer circuit board, a first rotor module with a plurality of rare-earth magnets, a first magnetic coil assembly, a spine tube, a power module with batteries, a second magnetic coil assembly, a second computer circuit board and a tail cone.

In an illustrative embodiment as shown in FIGS. 12 and 13, a rotary wing vehicle 135, in accordance with the present disclosure, includes a nose cone 136, which may include a payload, such as munitions, a camera or chemical or other sensor (not shown) and which payload is configured to deliver desired goods or services and/or to gather desired data during a flight of vehicle 135. Also shown in FIG. 12 or 13 are a GPS (Global Positioning System) antenna 137, a first computer circuit board 138 including control electronics such as a flight management system, a first rotor module 139, a second rotor module 140 including a plurality of rare-earth magnets 141, a first magnetic coil assembly 142, a structural spine tube 144, a power module 145 including a plurality of batteries 146, a second magnetic coil assembly 143, a second computer circuit board 147, and a tail cone 148, which may also include a payload, such as a laser altimeter, explosive munition, etc. (not shown).

First rotor module 139 and second rotor module 140 having a plurality of rare earth magnets 141 are substantially similar and include a first rotor hub 149 and a second rotor hub 150. First rotor blades 151 and second rotor blades 152 are collectively and cyclically pitchable by an internal mechanism (not shown).

First and second magnetic coil assemblies 142, 143 comprise a plurality of magnetic coils 153, 154 coupled to printed circuit boards 155, 156. A feature of the present disclosure is that the input and output ends of magnetic coils 153, 154 are soldered directly to printed circuit boards 155, 156 which include copper traces (not shown) that interconnect magnetic coils 153, 154 in a Wye or Delta configuration depending on the state (open/closed) of power relays (not shown). By switching between Wye and Delta configurations, rotor blades 151, 152 can be operated at high or low speeds efficiently, thereby maximizing the total propulsive efficiency, that is conversion of electrical energy into thrust, of the system over a broad range of operating conditions.

First and second coil assemblies 142, 143 produce fluctuating magnetic fields that operate on first and second magnetic ring assemblies 165, 166 on first rotor hub 149 and second rotor hub 150, respectively. Both magnetic ring assemblies 165, 166 comprise a plurality of individual rare-earth magnets 141 or a continuous magnetic ring (not shown) with numerous magnetic poles (not shown) which act like individual magnets.

Power module 145 comprises a plurality of electric batteries 146 and is mounted at an approximate center of gravity CG3 of rotary wing vehicle 135. Center of gravity CG3 is located approximately midway between rotor module 139 and rotor module 140. Power module 145 supplies power to drive both rotor modules 139, 140.

First coil assembly 142 and first magnetic ring 155 cooperate to form a first rotor driver or electric motor 157. First electric motor 157, which may be a direct drive motor, is often referred to as a pan-style motor because eletro-magnetic coils 153 are located on a flat surface of circuit board of 155 and rare-earth magnets, or magnetic ring, 141 are located on the flat face of rotor hub 149.

In illustrative embodiments, according to the present disclosure, it is a desirable feature to have all drive motors positioned to lie within or adjacent to the rotor hubs with power transmission between the rotor modules accomplished by way of electrical wiring via conduits or traces on electric circuit boards instead of mechanical shafting, thereby reducing mechanical complexity and weight. Because power and control of the rotor systems is entirely electrical in nature, the entire control system of the rotary wing vehicles disclosed herein can be operated electrically by digital computers and solid-state electronics without complicated mechanical linkages or hydraulic amplification.

The illustrative embodiments disclosed herein include a differential motor speed for yaw, or heading, control while in a vertical flight configuration. Some coaxial helicopters utilize variable blade pitch and differential blade angle to control yaw motions in flight. Differential torque generated by operating the rotor drivers at different speeds relative to the non-rotating body or airframe of the rotary wing vehicles generates yaw forces to stabilize and control yaw motion, for example, rotation about axis 28. In this way the torque, and eventually the speed, of the rotor drivers is increased or decreased in response to a yaw motion of the rotary wing vehicles about vertical axis 28. The torque, or speed, of one of the rotor drivers is adjusted automatically by an onboard computer system in opposition to the torque, or speed, of another rotor driver to maintain constant lift so that the rotary wing vehicles neither gain nor lose altitude.

While power for each rotor module 14, 16, 139, 140 is generally drawn from the nearest respective power modules 56, 145, the power modules 56, 145 communicate with each other electrically, electronically, and mechanically through conduits 58, 62 within the structural spine 64 to balance the energy contained within the power modules 56, 145. That is done so that the capacity of the power modules 56, 145 is used uniformly. In a case where the power modules 56, 45 include batteries, a computer-controlled power connection between the power modules 22, 24, 45 may balance the voltage and current draw from the batteries to ensure they discharge at the same rate.

While the embodiments disclosed herein describe rotor modules 14, 16, 139, 140 used in pairs, a single rotor module may be used on rotary wing vehicles 10, 35 if a tail rotor (not shown) on a tail boom (not shown) is provided to counteract toque.

In the illustrative embodiments, direct drive motors do not require a geared transmission system to drive rotor blades 42, 151, 152, respectively. As a result, direct drive motors 134, 157 can operate silently or with very little noise. This can be an advantage in some applications where operating noise level must be controlled or eliminated.

All drawings are not necessarily drawn exactly to scale. However, for example, rotary-wing vehicle 10, may have a span, or a tip-to-tip measurement, of approximately 30 inches for rotor blades 42. A diameter of body shell 32 is approximately 2.5 inches and a length of airframe 74 from top to bottom along longitudinal body axis 28 is approximately 22.0 inches.

The following generalized disclosure applies to all the disclosed embodiments, including rotary-wing vehicles 10 and 135.

In illustrative embodiments of the current disclosure, power to the rotor drivers in flight is provided by high-capacity electric batteries such as, for example, lithium-polymer or lithium-ion batteries, or fuel cells. Power modules may include, for example, six rechargeable lithium ion batteries arranged in a hexagonal pattern around the non-rotating airframe and wired in to produce about 11.3 volts of electrical potential. Power wires from the power modules are routed through the airframe to the motor speed controllers.

Multiple power modules may be provided for additional energy capacity during flight and may be wired in parallel to increase the electrical current available to the rotor drivers. Flight times of rotary wing vehicle 10 can be adjusted by adjusting the number of power modules carried in flight.

In illustrative embodiments, it may be a desirable feature for the rotary wing vehicles to be manufactured and assembled in modules. Rotor, control, power, booster, electronics and payload modules may be manufactured separately and slid onto the airframe.

In illustrative embodiments, each of the rotor systems of the coaxial system are driven by a separate electric motor located in the hub section of the rotor system. Power transmission to and between the rotors is accomplished through electrical wiring, i.e., passing the wiring through the hollow airframe, instead of mechanical shafting, clutches and gears. Direct electrical drive of the rotor system can be almost silent and vibration-free.

In the illustrative embodiments, swashplate control systems and electric drive motors are provided for each rotor system thereby simplifying the mechanical and electrical connections needed to drive and control the rotor blades. Rotor modules are provided to quickly and easily couple the rotor systems to the hollow airframe. Multiple rotor modules and swashplates may be controlled by a group, for example, two or more, of servo actuators housed in servo modules.

In illustrative embodiments, a method of establishing in-flight symmetry of balance and control authority is provided. This is done by distributing power modules above and below rotor modules to position, for example, the center of gravity of the rotary wing vehicles between the rotor blades. Thus, the balance and control authority of the rotary wing vehicles are proportionally configured.

While the embodiments disclosed herein are described as producing propulsive thrust in a downward direction for use on a helicopter, the present disclosure envisions that the disclosed embodiments may be configured to produce thrust in any direction, including horizontally to propel any type of aircraft horizontally or vertically. Additional lifting devices, such as wings, parafoils, gas bags, etc., may be used in conjunction with the embodiments of the present disclosure.

Other locations of a center of gravity for rotary vehicles 10, 35 are possible (not shown) depending upon the positioning of modules along non-rotating structural spine 64.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A rotary-wing vehicle comprising
an airframe establishing a longitudinal axis,
a first set of rotor blades coupled to the airframe and configured to rotate in a first direction about the longitudinal axis, and
a second set of rotor blades coupled to the airframe to lie in spaced-apart relation to the first set of rotor blades to define a space therebetween and configured to rotate in a second, opposite direction about the longitudinal axis, and wherein a center of gravity of the airframe is located in the space provided between the first and second sets of rotor blades
a first power source module configured to provide power of the first set of rotor blades and wherein the first power source module is coupled to the airframe and the first set of rotor blades is located between the center of gravity and the first power source module,
a second power source module configured to provide power to the second set of rotor blades and wherein the second power source module is coupled to the airframe and the second set of rotor blades is located between the center of gravity and the second power source module.

2. The rotary-wing vehicle of claim 1, further comprising a first pitch controller configured to vary a pitch of the first set of rotor blades, wherein the first pitch controller is coupled to the airframe and arranged to lie in the space between the first and second sets of rotor blades.

3. The rotary-wing vehicle of claim 2, further comprising a second pitch controller configured to vary a pitch of the second set of rotor blades, wherein the second pitch controller coupled to the airframe and arranged to lie in the space between the first and second sets of rotor blades.

4. The rotary-wing vehicle of claim 3, wherein the second pitch controller is located in the space between the second set of rotor blades and the center of gravity.

5. The rotary-wing vehicle of claim 3, wherein the center of gravity is located between the first and second pitch controllers.

6. The rotary-wing vehicle of claim 2, wherein the first pitch controller is located in the space between the first set of rotor blades and the center of gravity.

7. The rotary-wing vehicle of claim 1, further comprising a first payload module configured to provide at least one of means for delivering goods and means for gathering data during a flight of the vehicle, and wherein the first payload module is coupled to the airframe and the first set of rotor blades is located between the center of gravity and the first payload module.

8. The rotary-wing vehicle of claim 7, further comprising a second payload module configured to provide at least one of means for delivering goods and means for gathering data during a flight of the vehicle and wherein the second payload is coupled to the airframe and the second set of rotor blades is located between the center of gravity and the second payload module.

9. The rotary-wing vehicle of claim 1, further comprising a first electronics module configured to provide at least one of means for guidance and means for communications during a flight of the vehicle, and wherein the first electronics module is coupled to the airframe and the first set of rotor blades is located between the center of gravity and the first electronics module.

10. The rotary-wing vehicle of claim 9, further comprising a second electronics module configured to provide at least one of means for guidance and means for communications during a flight of the vehicle, and wherein the second electronics module is coupled to the airframe and the second set of rotor blades is located between the center of gravity and the second electronics module.

11. The rotary-wing vehicle of claim 1, wherein the first power source module is configured to provide means for providing power to rotate the first set of rotor blades about the longitudinal axis, and wherein the first power source module is coupled to the airframe and the first set of rotor blades is arranged to lie on the airframe between the first power source module and the center of gravity.

12. The rotary-wing vehicle of claim 11, further comprising a first payload module configured to provide at least one of means for delivering goods and means for gathering data during a flight of the vehicle, and wherein the first payload module is coupled to the airframe and arranged to lie between the first power source module and the first set of rotor blades.

13. The rotary-wing vehicle of claim 11, further comprising a first electronics module configured to provide at least one of means for guidance and means for communications during a flight of the vehicle, and wherein the first electronics module is coupled to the airframe and arranged to lie between the first power source module and the first set of rotor blades.

14. The rotary-wing vehicle of claim 1, further comprising a first pitch controller to control the pitch of the rotor blades, and wherein the first pitch controller is coupled to the airframe and arranged to lie in the space between the first and second sets of rotor blades and also between the first set of rotor blades and the center of gravity.

15. The rotary-wing vehicle of claim 1, further comprising first and second payload modules to provide at least one of means for delivering of goods and means for gathering of data during a flight of the vehicle, first and second electronics modules to provide at least one of means for guidance and means for communications during a flight of the vehicle, and first and second pitch controllers to provide pitch control for the first and second sets of rotor blades, respectively, all modules being coupled to the airframe, and wherein the first payload module, the first electronics module, and the first pitch controller are arranged to lie between the first power source module and the center of gravity, and the second power source module, the second electronics module and the second pitch controller are arranged to lie between the second payload module and the center of gravity.

16. The rotary-wing vehicle of claim 1, further comprising first and second pitch controllers to provide pitch control for the first and second sets of rotor blades, respectively, wherein the first and second pitch controllers are coupled to the airframe and arranged to lie in the space between the first and second sets of rotor blades.

17. The rotary-wing vehicle of claim 1, further comprising first and second pitch controllers to control the pitch of the first and second sets of rotor blades, respectively, and wherein the first pitch controller is coupled to the airframe and arranged to lie between the first set of rotor blades and the center of gravity, and further wherein the second pitch controller is coupled to the airframe and arranged to lie between the second set of rotor blades and the center of gravity.

* * * * *